United States Patent
Shinichi et al.

(10) Patent No.: US 7,821,608 B2
(45) Date of Patent: Oct. 26, 2010

(54) LIQUID CRYSTAL DISPLAY DEVICE AND THE METHOD THEREOF

(75) Inventors: Kimura Shinichi, Yokohama (JP); Furuta Kaoru, Yokohama (JP); Yamashita Hidefumi, Yokohama (JP); Nagayama Kazuyoshi, Yokohama (JP); Momoi Yuichi, Yokohama (JP); Yoshida Hidefumi, Yokohama (JP)

(73) Assignee: LG Display Co., Ltd., Seoul (KR)

( * ) Notice: Subject to any disclaimer, the term of this patent is extended or adjusted under 35 U.S.C. 154(b) by 246 days.

(21) Appl. No.: 11/642,955

(22) Filed: Dec. 21, 2006

(65) Prior Publication Data

US 2007/0200989 A1    Aug. 30, 2007

(30) Foreign Application Priority Data

Dec. 28, 2005    (JP) .......................... P 2005-380360

(51) Int. Cl.
*G02F 1/1343* (2006.01)

(52) U.S. Cl. ...................................... 349/144; 349/142

(58) Field of Classification Search ................. 349/144, 349/142

See application file for complete search history.

(56) References Cited

U.S. PATENT DOCUMENTS

| | | | |
|---|---|---|---|
| 5,162,933 A | 11/1992 | Kakuda et al. | |
| 5,317,433 A | 5/1994 | Miyawaki et al. | |
| 5,339,181 A | 8/1994 | Kim et al. | |
| 5,462,887 A | 10/1995 | Glück | |
| 5,668,379 A | 9/1997 | Ono et al. | |
| 5,731,856 A | 3/1998 | Kim et al. | |
| 5,771,083 A | 6/1998 | Fujihara et al. | |
| 5,793,460 A | 8/1998 | Yang | |
| 5,847,781 A | 12/1998 | Ono et al. | |
| 2004/0189925 A1* | 9/2004 | Ohmuro et al. ............. 349/144 | |

FOREIGN PATENT DOCUMENTS

JP    5-72529    3/1993

* cited by examiner

*Primary Examiner*—Jerry T Rahll
(74) *Attorney, Agent, or Firm*—McKenna Long & Aldridge

(57) ABSTRACT

Disclosed herein is a liquid crystal display device which can control a viewing angle in up/down and left/right directions without need of forming white subpixels. In the liquid crystal display device which includes a first region having liquid crystal molecules aligned in a slanted direction, and a second region having the liquid crystal molecules aligned in up and down directions or in left and right directions. Voltage is independently applied to the second region from the first region.

23 Claims, 12 Drawing Sheets

When no voltage is applied

When voltage is applied

When no voltage is applied

When voltage is applied large scale televisions and the like. Of them, some display devices# LIQUID CRYSTAL DISPLAY DEVICE AND THE METHOD THEREOF This application claims the benefit of Japanese Patent Application No. 2005-380360, on Dec. 28, 2005, which is hereby incorporated by reference as if fully set forth herein.

BACKGROUND OF THE INVENTION

1. Field of the Invention

The present invention relates to a liquid crystal display device those and more particularly to a liquid crystal display device which can control a viewing angle.

2. Discussion of the Related Art

Generally, liquid crystal display devices, especially, using a thin film transistor (TFT), are used in mobile phones, large scale televisions and the like. Of them, some display devices for a personal purpose are required to satisfy a condition that a display is viewable to only a user and not viewable to others who look at the display from the slanted viewing direction.

It is more preferable that display devices are configured to have different display modes such that a display is viewable to all observers in some cases and viewable to only a user in other cases.

FIG. 8 is a view for explaining a related art liquid crystal display device having a confidential mode.

A related art liquid crystal display (LCD) device having a confidential mode illustrated in FIG. 8 has been proposed (see Japanese Patent Laid-open Publication No. 5-72529). A backlight having a high directivity is used for illuminating an LCD panel from the back.

Means for converting a light-scattering state into a non-scattering state and vice versa, for example, a polymer dispersed LCD panel (a scattering/non-scattering switching layer), is provided between the common LCD panel and the directional backlight. When the switching layer is in a non-scattering state, because light emitted from the backlight is irradiated to only the front, the display is invisible from the slanted viewing direction.

On the other hand, when the switching layer is in a scattering state, because light emitted from the backlight spreads in different directions, all observers can see the display from the slanted viewing direction as well as the front. However, the LCD panel having the above-described effect increases manufacturing costs of the LCD device because it needs a special LCD panel in addition to the common LCD panel.

To solve this problem, a vertical alignment LCD device has been devised. The vertical alignment LCD device will be described with reference to FIGS. 9 to 12.

FIG. 9 is a view illustrating a shape of a liquid crystal molecule when viewing a vertical alignment LCD device from the front. In a voltage non-applied state, the liquid crystal molecule is vertically aligned (see FIG. 9A). In a voltage applied state, the liquid crystal molecule is slanted upward (see FIG. 9B). An absorption axis of a polarizer is directed up and down, and the absorption axis of an analyzer is directed left and right.

FIG. 9A illustrates the vertically aligned liquid crystal molecule in the voltage non-applied state when seen from the front. In this state, birefringence of the liquid crystal molecule is not generated, and light leakage does not happen.

FIG. 9B shows the liquid crystal molecule in the voltage applied state when seen from the front. In this state, an optical axis of the liquid crystal molecule is parallel with the absorption axis of the polarizer. Similarly, birefringence is not generated, and light leakage does not happen.

FIG. 10 is a view illustrates the shape of the liquid crystal molecule when viewing the vertical alignment LCD device from the side.

As illustrated in FIG. 10A, in the voltage non-applied state, because the optical axis of the liquid crystal molecule is parallel with the absorption axis of the analyzer, light leakage does not happen.

On the other hand, as illustrated in FIG. 10B, in the voltage applied state, because the optical axis of the liquid crystal molecule is misaligned from the absorption axis of the polarizer or the analyzer, birefringence is generated, and light leakage happens.

As a result of such light leakage and because display contrast falls extremely low in left and right directions, the display is invisible when seen from the left or right slanted viewing direction. By using this phenomenon, confidentiality of the display can be controlled.

FIG. 11 is a view illustrating a basic constitution for controlling confidentiality of the display.

As illustrated in FIG. 11, one pixel includes RGB (Red, Green and Blue) subpixels, and an additional W (White) subpixel.

FIG. 12 is a view illustrating arrangement of liquid crystal molecules in the respective subpixels depicted in FIG. 11. As illustrated in FIG. 12, the liquid crystal molecules in the W subpixel are arranged in up and down directions, which is different from the arrangement of the liquid crystal molecules in the RGB subpixels.

When voltage is not applied to the W subpixel, because the W subpixel has no effect on a display, a common display appears such that the display is visible from different directions.

On the other hand, when voltage is applied to the W subpixel, the white areas are displayed in the left and right directions. As a result, the display contrast falls in the left and right directions, and the display is invisible to others who look at the display from the left/right slanted viewing direction.

FIG. 13 is a view schematically showing a basic structure of the related art vertical alignment LCD device.

As illustrating in FIG. 13, a transparent electrode which is disposed on an upper side is formed with a structure like a rib or a protrusion.

Another transparent electrode, which is disposed on a lower side, is formed with slits which have a width of about 10 microns. In the voltage non-applied state, the liquid crystal molecules are vertically aligned. In the voltage applied state, the liquid crystal molecules are aligned in a slanted direction which is determined by an influence of a slanted electric field by the structure (the protrusion or the slits), i.e., in a direction perpendicular to the extending direction of the structure (the protrusion or the slits).

However, the above related art liquid crystal display device has the following problems.

Forming the W (white) subpixels requires newly a white resin to be newly formed and a driving method is also changed.

Also, while the contrast in the left and right directions is lowered, the contrast in the up and down directions is not lowered.

SUMMARY OF THE INVENTION

Accordingly, the present invention is directed to a liquid crystal display device that substantially obviates one or more problems due to limitations and disadvantages of the related art.

An advantage of the present invention is to provide a liquid crystal display device which can control a viewing angle in up/down and left/right directions without need of forming white subpixels.

To achieve these and other advantages and in accordance with the purpose of the invention, as embodied and broadly described herein, a liquid crystal display device includes: a first region having liquid crystal molecules aligned in a slanted direction; and a second region having the liquid crystal molecules aligned in up and down directions or in left and right directions. And the liquid crystal molecules in the first region are independent controllable from the liquid crystal molecules of the second region.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE ILLUSTRATED EMBODIMENTS

Reference will now be made in detail to the preferred embodiments of the present invention associated with a liquid crystal display device, examples of which are illustrated in the accompanying drawings. Wherever possible, the same reference numbers will be used throughout the drawings to refer to the same or like parts.

Figure 1:
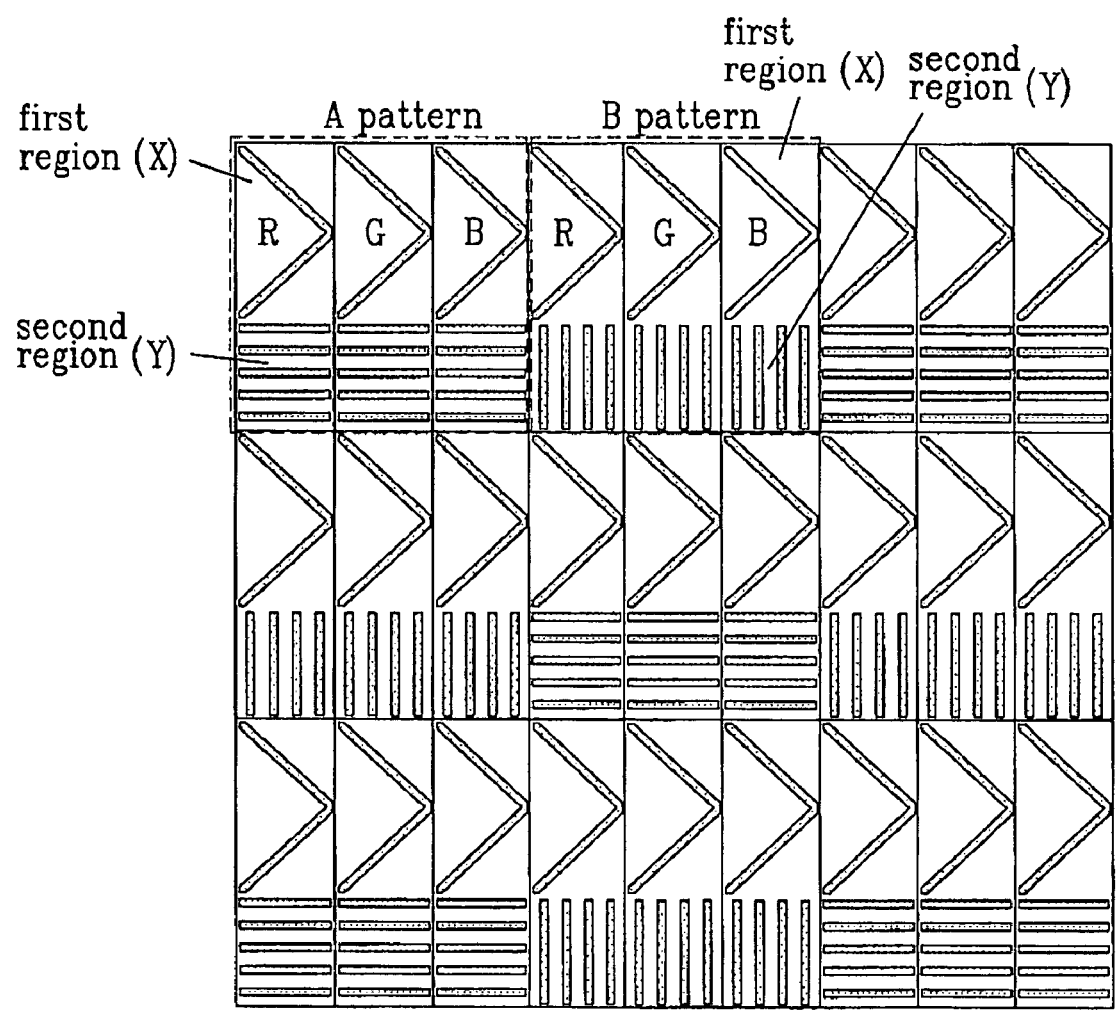
FIG. 1 is a view illustrating a basic constitution of a viewing angle control pattern of a liquid crystal display device in accordance with a first embodiment of the present invention.

FIG. 1 is a view illustrating a basic constitution of a viewing angle control pattern of a liquid crystal display (LCD) device in accordance with a first embodiment of the present invention. The LCD device comprises RGB (Red, Green and Blue) subpixels which respectively include a first region X and a second region Y.

The first region X is a region where alignment of liquid crystal molecules is controlled such that the liquid crystal molecules are aligned in the slanted direction. The first region X is formed with a "<" shaped structure such as a protrusion a slit.

The second region Y is a region where the liquid crystal molecules are controlled to be aligned in up and down directions or in left and right directions. The second region Y is formed such that a liquid crystal layer is inserted with a cross nicol arrangement of a polarizer and an analyzer whose absorption axes lie in the up and down directions and the left and right directions. Voltage is independently applied to the second region Y the first region X. The second region Y is formed with a structure such as a protrusion or a slit that extends in the up/down or left/right directions.

FIG. 1 illustrates an exemplary viewing angle control pattern of the LCD device in which some pixels include the protrusions (or the slits) of the second regions Y arranged in the horizontal direction and some pixels include protrusions (or the slits) of the second regions Y arranged in the vertical direction.

Hereinafter, for ease of description, the group of the pixels where the protrusions (or the slits) of the second regions Y are arranged in the horizontal direction will be referred to as an A pattern, and the group of the pixels where the protrusions (or the slits) of the second regions Y are arranged in the vertical direction will be referred to as a B pattern. A plurality of A patterns and B patterns are arranged in a checker pattern.

For example, a display screen formed by approximately 1000×1000 pixels may be divided into the A pattern region and the B pattern region in the display screen.

Figure 2A:
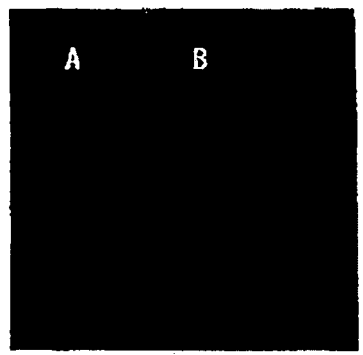
FIG. 2 is a view showing brightness distribution of second regions of a viewing angle control pattern in accordance with a first embodiment of the present invention.

FIG. 2 is a view showing brightness distribution of the second regions Y of the viewing angle control pattern in accordance with the first embodiment of the present invention. FIG. 2A shows the A patterns and the B patterns when voltage is not applied to the second regions Y in both the A patterns and the B patterns.

In this state, the liquid crystal molecules are vertically aligned and the display of the second region becomes black, whereby the display is not affected. This is the same at all directions, i.e., the front, up and down, left and right, and slanted viewing angles. And, the overall display appears normally.

Figure 2B:
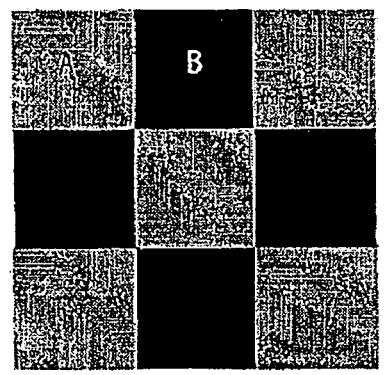

FIG. 2B shows the A patterns and the B patterns when voltage is applied to the second regions Y in both the A patterns and the B patterns and when seen from the left and right slanted viewing directions. In this state, the A patterns (in FIG. 1) where the protrusions (or the slits) of the second regions Y are arranged in the horizontal direction transmit bright light.

On the other hand, in the B patterns (in FIG. 1) where the protrusions (or the slits) of the second regions Y are arranged in vertical direction, light leakage does not happen. As a result, as shown in FIG. 2B, the checker pattern is displayed such that the display color of the A patterns is white and the display color of the B patterns is black. Also, the checker pattern overlaps with the common display pattern. Consequently, when the patterns are viewed in the left and right viewing direction, it is not possible to recognize what is written.

Figure 2C:
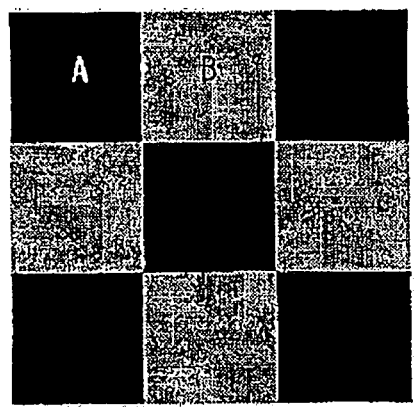

FIG. 2C shows the A patterns and the B patterns when voltage is applied to the second regions Y in both the A patterns and the B patterns and when seen from the up and down directions. In this state, in the A patterns where the protrusions (or the slits) of the second regions Y are arranged in the horizontal direction, light leakage does not happen.

On the other hand, the B patterns where the protrusions (or the slits) of the second regions Y are arranged in the vertical direction transmit relatively bright light. As a result, as shown in FIG. 2C, the checker pattern is displayed such that the display color of the A patterns is black and the display color of the B patterns is white (which is opposite to the checker pattern shown in FIG. 2B). Also, the checker pattern overlaps with the common display pattern. Consequently, when the patterns are viewed in the up and down viewing direction, it is not possible to recognize what is written.

Based upon the above-described basic principle of the present invention, the arrangement of the A patterns and the B patterns in the pixels will be described hereinafter. Also, when applying voltage to the horizontal and vertical structure patterns, the following will be described in detail:

a) voltage is applied to a position opposite to the mounting position of the gate driver;

b) according to the change of the arrangement of the horizontal and vertical structure patterns, the checker pattern can be changed into other diverse patterns; and c) by changing the direction of applied voltage, the confidentiality of the display can be enhanced.

Of course, it is needless to say that it is possible to constitute the viewing angle control pattern with only one pattern of the horizontal pattern and the vertical pattern.

Figure 3:
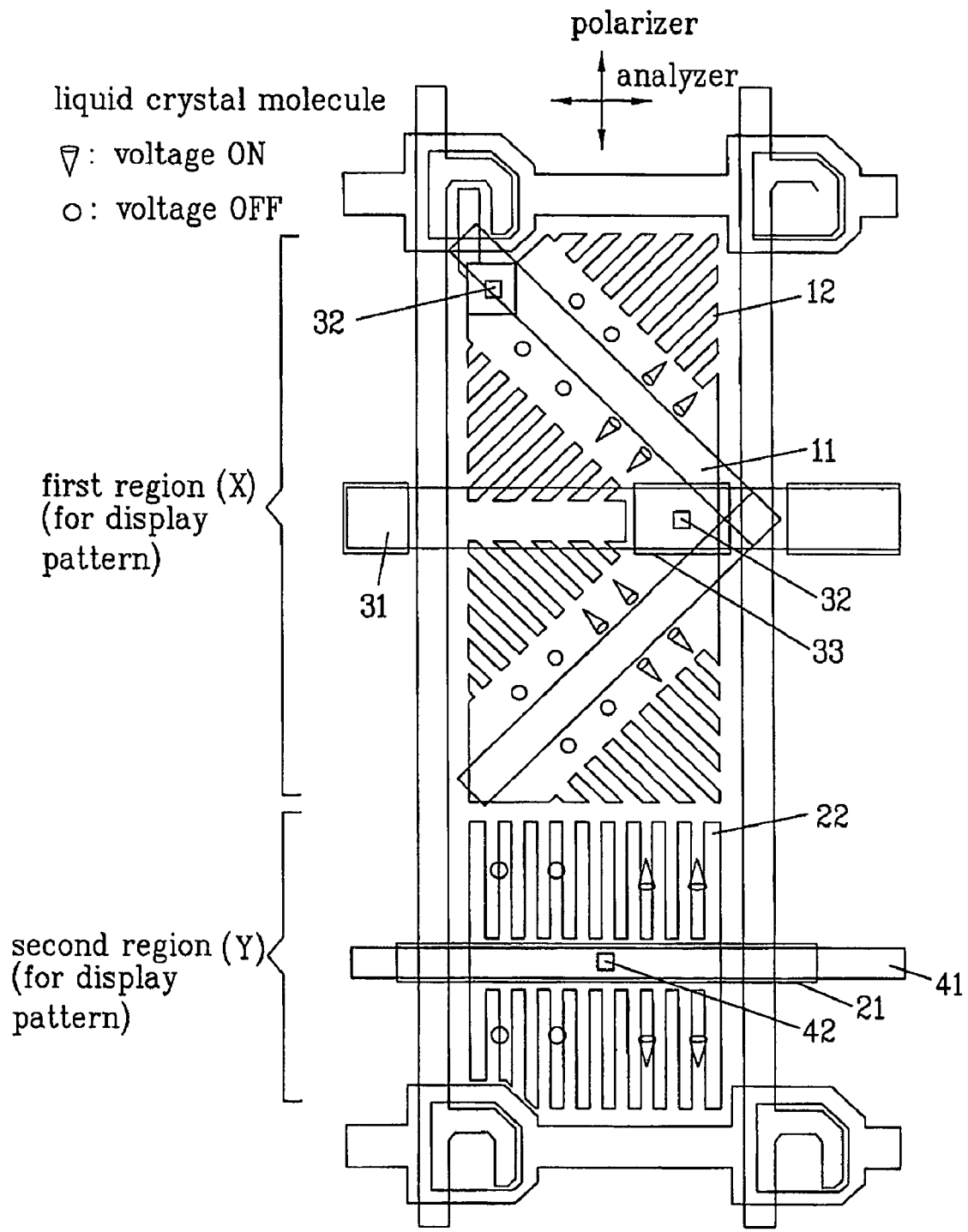
FIG. 3 is a view illustrating an example of a pixel design of a viewing angle control pattern in accordance with a first embodiment of the present invention.

FIG. 3 is a view illustrating an example of a pixel design of the viewing angle control pattern in accordance with the first embodiment of the present invention. The pixel is divided into two portions, i.e., the first region X and the second region Y. FIG. 3 corresponds to an enlarged view of one subpixel illustrated in FIG. 1.

The first region X is for showing the display pattern, and the second region Y is for controlling the viewing angle.

The absorption axis of the polarizer sets with the up and down directions of the display, and the absorption axis of the analyzer sets with the left and right directions of the display. Also, a vertical alignment layer is formed on the surface, so that the liquid crystal molecules are vertically aligned in the voltage non-applied state.

Further, by negative dielectric anisotropy, the liquid crystal molecules are set to be vertically aligned in the voltage non-applied state and the liquid crystal molecules are set to be aligned in the slanted direction in the voltage applied state. A chiral dopant may be added to the liquid crystal.

In the first region X for the display pattern, a structure (a protrusion or a slit) 11 for the alignment control is slantedly formed with 45 degrees and 135 degrees. In order to more accurately control the alignment, a plurality of small slits 12 are formed substantially perpendicularly to the structure (the protrusion) 11. Of course, the formation of the small slits 12 in the first region X may be omitted. A common electrode 31 is disposed across the middle portion of the first region X and is connected to a source layer 33 through a contact hole 32.

As described above, in the first region X, the structure (the protrusion or the slit) 11 is slantedly formed at the pixel electrode. On the other hand, as illustrated in FIG. 3, in the A pattern of the second region Y, a wide structure (a protrusion or a slit) 21 is formed at the electrode in the left and right directions, thereby stabilizing the alignment.

Although it is not illustrated in the drawing, in the B pattern of the second region Y, a wide structure (a protrusion or a slit) is formed at the pixel electrode in the up and down directions to stabilize the alignment.

Here, in the first region X, the structure (the protrusion or the slit) 11 is slantedly formed at the pixel electrode. In the A pattern of the second region Y, a plurality of small slits 22 are formed at the pixel electrode in the up and down directions. Also, although it is not illustrated in the drawing, in the B pattern of the second region Y, a plurality of small slits is formed at the pixel electrode in the left and right (horizontal) directions.

In the second region Y for making the panel has the confidentiality of the display. It is necessary that the liquid crystal molecules be aligned in the up/down or left/right directions to provide a confidential display. To this end, as illustrated in FIG. 3, a plurality of small slits 22 having a width of about 3.5 microns and a gap of about 3 microns are formed in the up/down or left/right directions, so that the liquid crystal molecules are to be forced aligned substantially in parallel with the slits 22.

And, in the second region Y, a plurality of small slits having a width of about 5 microns and less and a gap of about 5 microns or less are formed on an entire surface. However, such small slits may be a cause of a mura defect. The second region Y does met have the problem of the mura defect, but the mura defect in the first region X appears as the display mura.

Therefore, while the small slits are formed at the front surface in the second region Y, the small slits are not formed on the entire surface in the first region X or are partially-formed.

In the second region Y for controlling the confidentiality of the display, an electrode 41 is provided to extend in the left and right directions by using a gate layer in order to independently apply voltage to the second region Y.

In the second region Y in each pixel, a metal line using the gate layer is formed in parallel with a gate electrode, and the pixel electrode of the second region Y is connected to the metal line through a contact hole 42. The pixel can be made substantially symmetrical with the metal line extending across the middle portion of the second region Y in each pixel.

The contact hole 42 may be formed by a process of forming a hole to contact the pixel electrode of the first region X and the source electrode.

Figure 4:
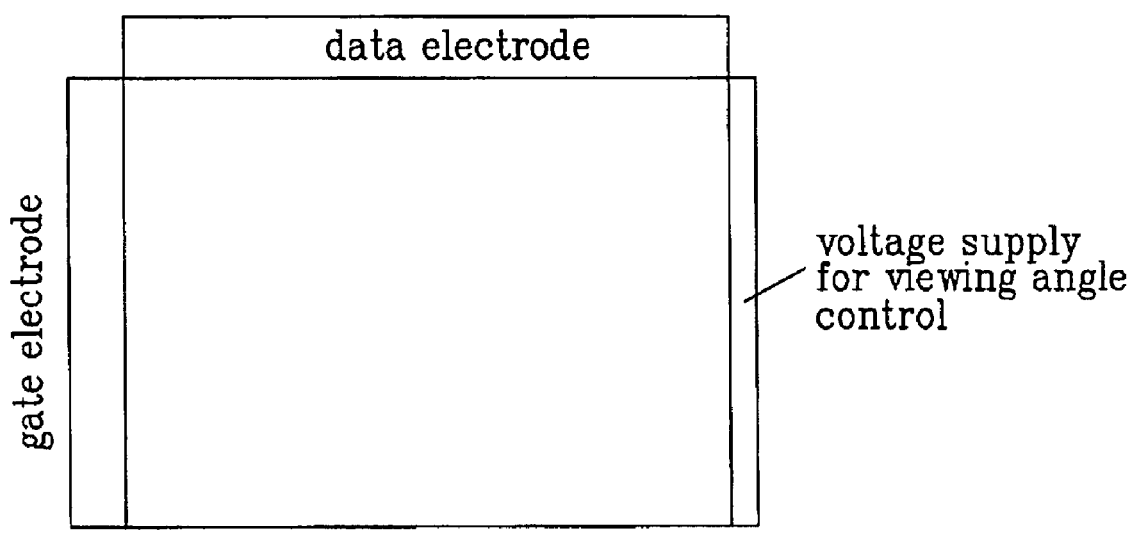
FIG. 4 is an arrangement view of electrodes for supplying voltage in a viewing angle control pattern in accordance with a first embodiment of the present invention.

FIG. 4 is an arrangement view of electrodes for supplying voltage in the viewing angle control pattern in accordance with the first embodiment of the present invention.

As illustrated in FIG. 4, in order to apply voltage, the electrode 41 extending to the right from the gate electrode is positioned opposite to the gate driver.

In order to prevent damage of the liquid crystals, alternating current (AC) voltage is applied. The center voltage of the AC is a voltage of common transparent electrodes on a color filter (CF) substrate, which are oppositely positioned. The center voltage is different from the center voltage applied to the pixels for displaying.

As described above, for the purpose of the confidentiality of the display, the structures are formed vertically or horizontally in the respective pixels so that the liquid crystal molecules are aligned in the up/down or left/right directions. The arrangement of the A patterns having the horizontal structure pattern and the B patterns having the vertical structure pattern may be varied in the display screen.

Figure 5A:
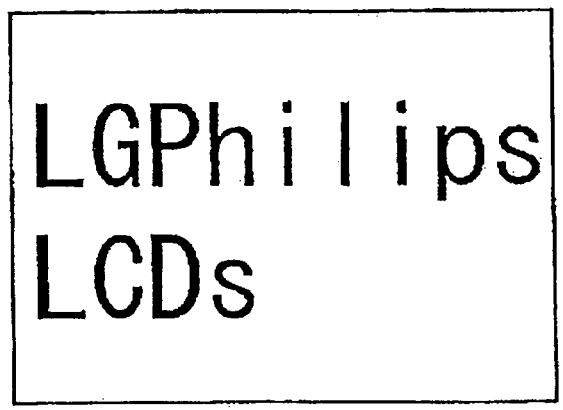
FIG. 5 is a view illustrating an example of a confidential display pattern in a viewing angle control pattern in accordance with a first embodiment of the present invention.
Figure 5B:
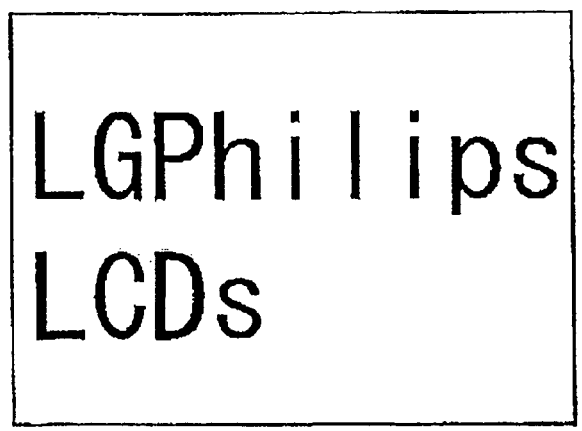
Figure 5C:
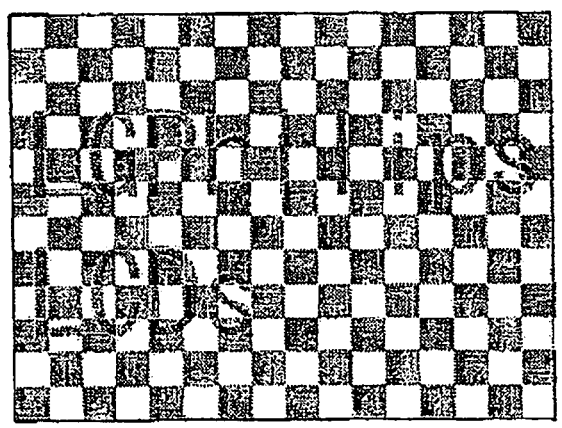

FIG. 5 is a view illustrating an example of a confidential display pattern in the viewing angle control pattern in accordance with the first embodiment of the present invention. FIG. 5A illustrates the display when seen from the front. FIG. 5B illustrates the display in a viewing angle non-control mode when seen from the front and from the slanted viewing direction. FIG. 5C illustrates the display in a viewing angle control mode when seen from the slanted viewing direction. Also, FIG. 5C illustrates application of the checker pattern shown in FIG. 2 to have a confidential display by.

When voltage is not applied to the region for controlling the confidential display, as illustrated in FIG. 5B, the display is normally visible when seen from up/down/left/right, as well as from the front. On the other hand, when voltage is applied to the region for controlling the confidential display, the display is visible from the front, the same as the display illustrated in FIGS. 5A and 5B. However, when seen from the slanted viewing direction, as illustrated in FIG. 5C, the display is overlapped with the checker pattern, for example, so that it is difficult to perceive the display.

FIG. 6 is a view illustrating another example of a confidential display pattern in the viewing angle control pattern in accordance with the first embodiment of the present invention. FIG. 6 illustrates the state of performing the confidential display by characters "Confidential".

Figure 6A:
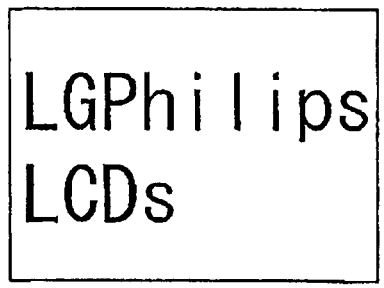
FIG. 6 is a view illustrating another example of a confidential display pattern in a viewing angle control pattern in accordance with a first embodiment of the present invention.
Figure 6B:
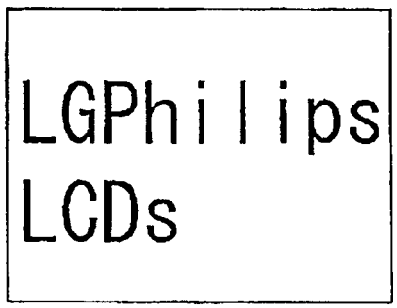

FIG. 6A illustrates the display when seen from the front. FIG. 6B illustrates the display in the viewing angle non-control mode when seen from the front and from the slanted viewing direction.

Figure 6C:
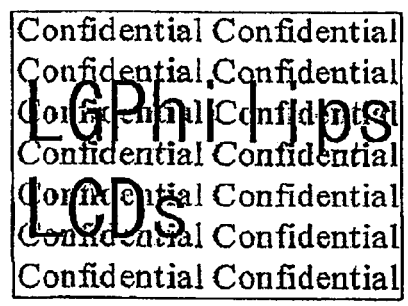
Figure 6D:
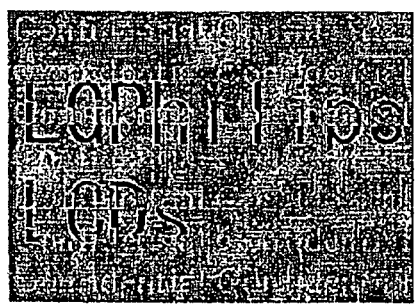

FIG. 6C illustrates the display in the viewing angle control mode when seen from the left and right slanted viewing directions; and FIG. 6D illustrates the display in the viewing angle control mode when seen from the up and down slanted viewing directions.

As illustrated in FIGS. 6C and 6D, the confidential display pattern in the left and right directions is opposite to the confidential display pattern in the up and down directions.

As described above, the confidential display pattern may be embodied by certain characters or patterns. In other words, the checker pattern (see FIG. 5) acquired by arranging the A patterns and the B patterns in the second regions Y for controlling the viewing angle and the characters having the predetermined meaning (see FIG. 6) can be formed as the confidential display pattern.

According to the first embodiment of the present invention described as above, since the second regions Y capable of making the panel have the information confidentiality are formed in the pixels, and voltage is independently applied to the second regions Y from the first regions X for the common display pattern, there is provided a liquid crystal display device capable of controlling the viewing angle in the up/down and left/right directions by using the desired confidential display pattern.

The confidential display pattern of the second regions Y is not limited to the mosaic pattern, and can be embodied as arbitrary patterns, colorful displays or natural object displays.

Hereinafter, a liquid crystal display device in accordance with a second embodiment of the present invention will be described. The second embodiment relates to a technique of varying the confidential display pattern by controlling voltage applied to the second regions Y for the viewing angle control pattern.

Figure 7:
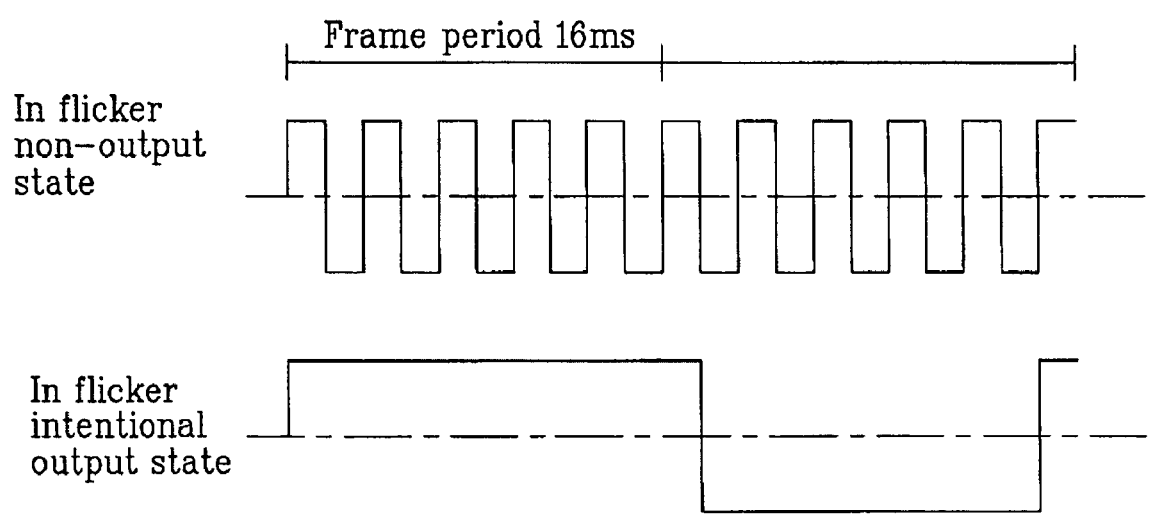
FIG. 7 is a view illustrating a voltage applying pattern to second regions in a viewing angle control pattern in accordance with a second embodiment of the present invention.
Figure 8:
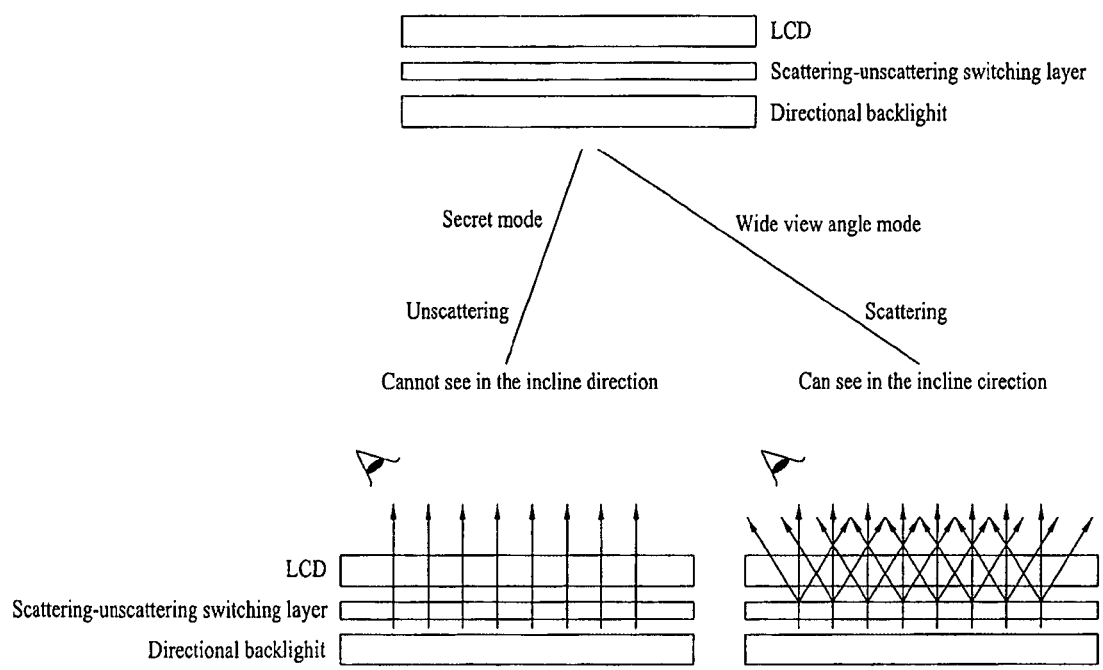
FIG. 8 is a view for explaining a related art liquid crystal display device having a confidential mode.
Figure 9A:
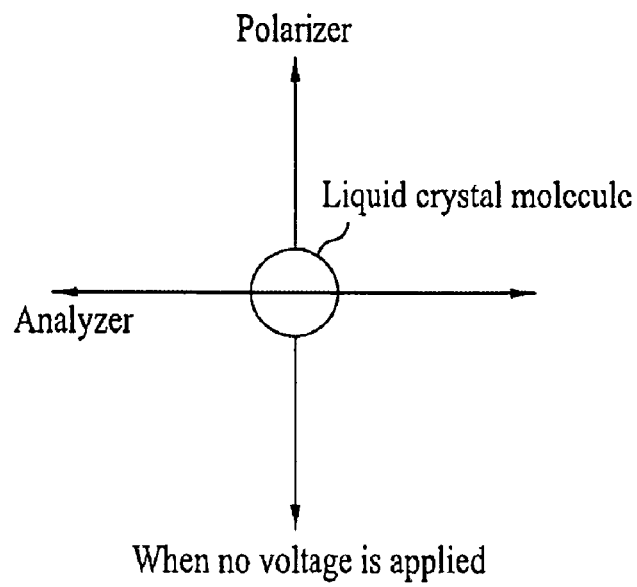
FIG. 9 is a view illustrating a shape of a liquid crystal molecule when viewing a vertical alignment LCD device from the front.
Figure 9B:
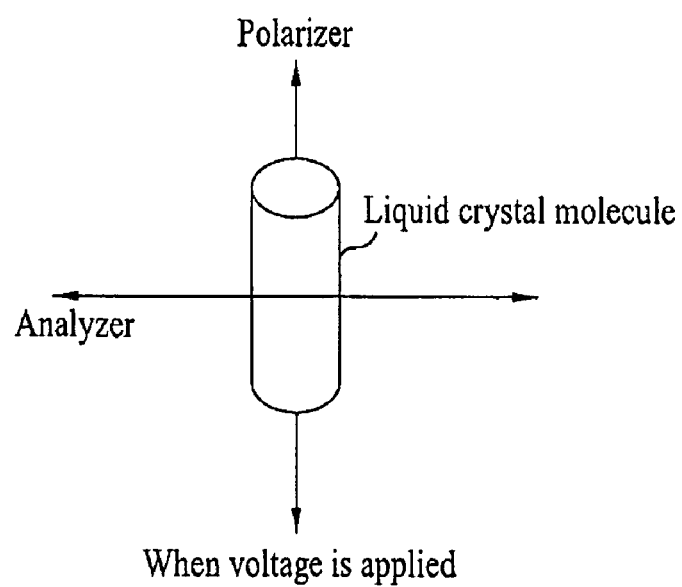
Figure 10A:
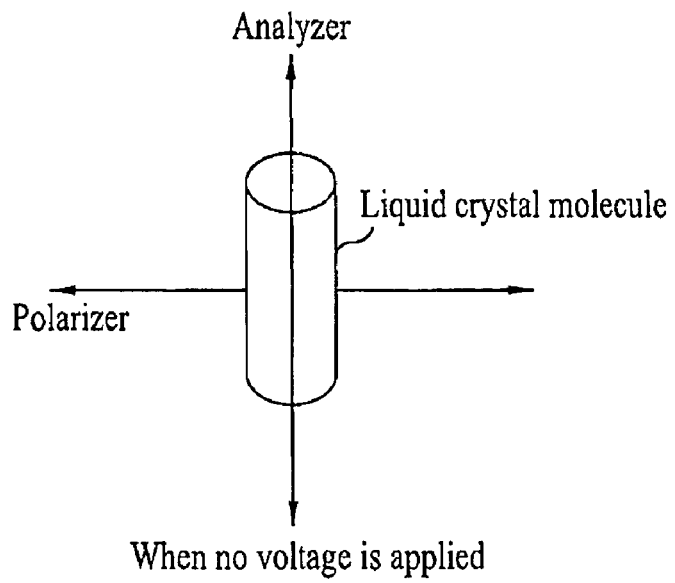
FIG. 10 is a view illustrating a shape of a liquid crystal molecule when viewing a vertical alignment LCD device from the side.
Figure 10B:
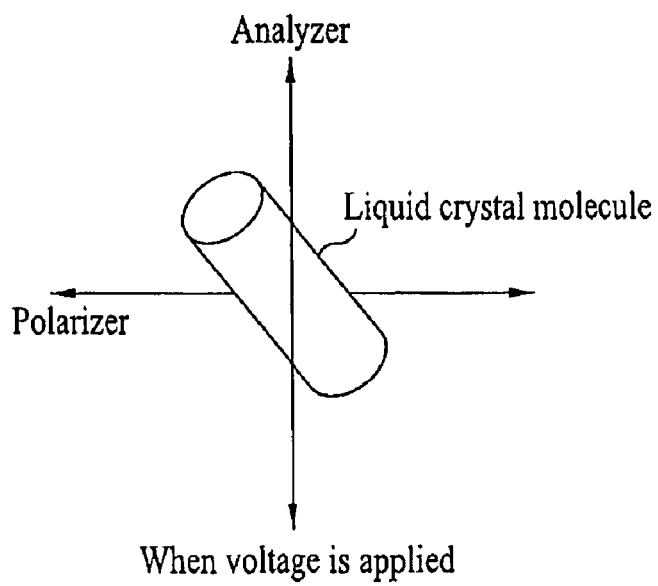
Figure 11:
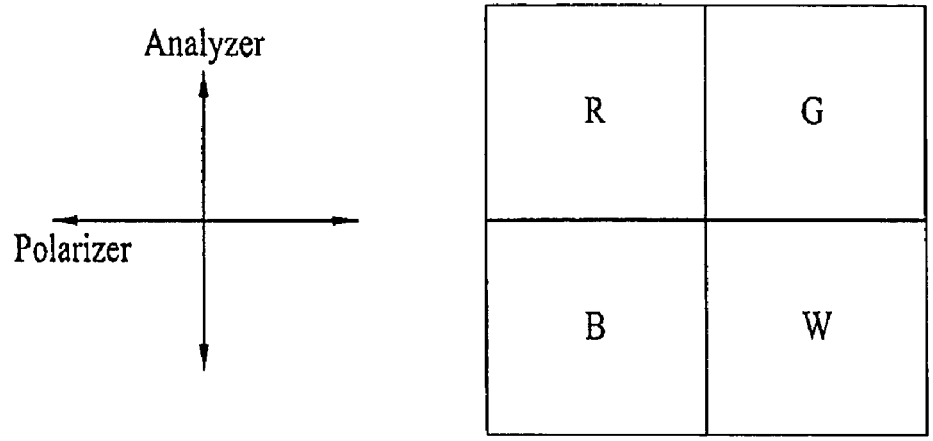
FIG. 11 is a view illustrating a basic constitution for controlling confidentiality of the display.
Figure 12:
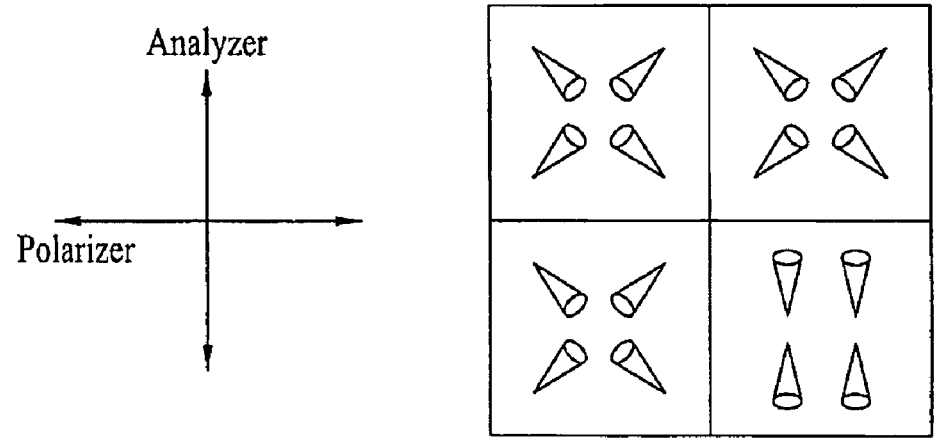
FIG. 12 is a view illustrating arrangement of liquid crystal molecules in respective subpixels depicted in FIG. 11.
Figure 13:
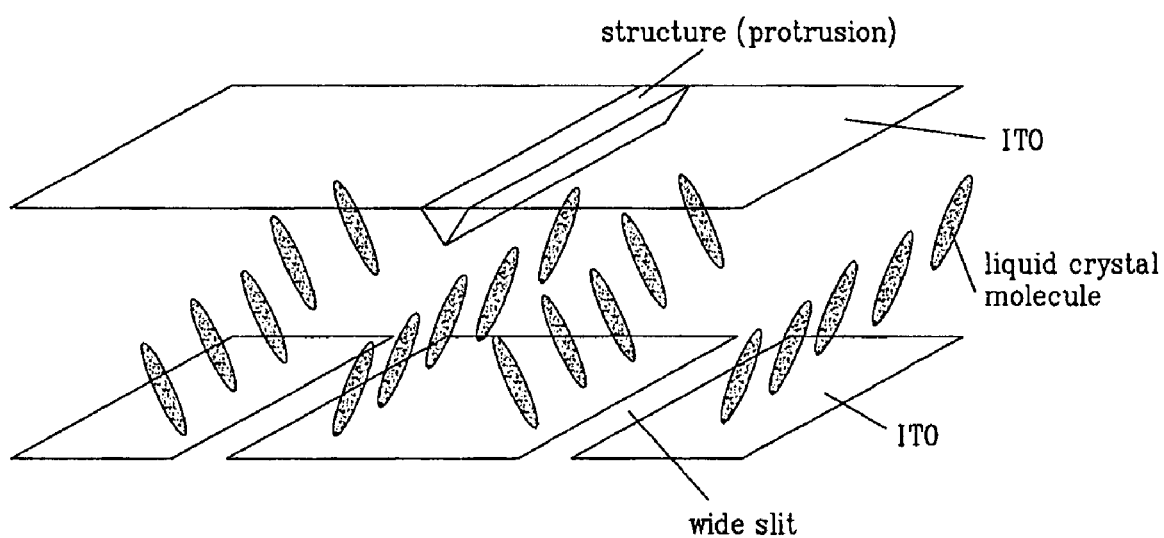
FIG. 13 is a view schematically illustrating a basic structure of a related art vertical alignment LCD device.

FIG. 7 is a view showing a voltage applying pattern to the second regions Y in accordance with the second embodiment of the present invention. By controlling voltage applied to the second regions Y, the displayed information can be kept confidential when seen from slanted viewing direction.

When a period of the applied AC voltage is long, the liquid crystal molecules move rapidly, so they are subjected to flicker. Accordingly, as shown in the lower drawing in FIG. 7, by controlling the frequency of the AC voltage to be 60 Hz and less, for example, to be 30 Hz and less, it is possible to make the confidential display flicker.

Alternatively, the voltage of the opposite electrodes may be distributed as the center voltage when the voltage is applied periodically. Furthermore, the value of voltage applied periodically may be varied periodically. Yet alternatively, the voltage may be turned ON and OFF periodically.

As a result, when viewing the display from the slanted viewing direction, the characters "Confidential" illustrated in FIG. 6, may be changed periodically, thus hindering perceiving accurately the displayed information, thereby enhancing the confidentiality of the information.

According to the second embodiment of the present invention described as above, when controlling the voltage applied to the second regions Y, by adequately determining the voltage applying pattern to acquire the desired confidential display pattern, the confidentiality of the information can be enhanced, and the adjustment of the viewing angle in the up/down and left/right directions are achieved.

Also, the present invention may be modified such that the user is able to control the voltage applied to the second regions Y. Further, the present invention may be modified to change the period of the AC voltage applied to the second regions Y.

Accordingly, the present invention does not provide a person in front of the screen with a feeling of incompatibility. Also, the present invention enables a person who looks at the screen from the slanted viewing direction to observe the display on the screen without the feeling of incompatibility, and prevents the display on the screen from being offensive to the eye.

Furthermore, the process of manufacturing the liquid crystal panel used in the present invention is the same as that of manufacturing the related art one, and no panel is added to the present invention.

As apparent from the above description, according to the liquid crystal display device in accordance with the present invention, by providing one pixel with the first region where the liquid crystal molecules are controlled to be aligned in the slanted direction and the second region where the liquid crystal molecules are controlled to be aligned in the up/down or left/right directions, and by independently applying voltage to the second region from the first region, the adjustment of the viewing angle in the up/down and left/right directions can be achieved without forming a white subpixel.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display having a plurality of pixels, each pixel comprising:

a first region having liquid crystal molecules aligned in a slanted direction; and a second region including an up and down control region having liquid crystal molecules aligned in up and down directions or a left and right control region having liquid crystal molecules aligned in left and right directions, wherein voltage is independently applied to the first region and the second region so that the liquid crystal molecules in the first region is independent controllable from the liquid crystal molecules of the second region, and wherein each of the pixels is one of red, green and blue subpixels.

2. The device according to claim 1, wherein voltage which is turned ON and OFF periodically is applied to the second region.

3. The device according to claim 1, wherein alternating current voltage whose frequency is about 30 Hz and less is applied to the second region.

4. The device according to claim 1, further comprising:
a common line across a middle portion of the first region in each of the pixels.

5. The device according to claim 1, wherein the first region has at least one of a first slit and a first protrusion in a pixel electrode in a slanted direction, and the second region has the up and down control region having one of a second slit and a second protrusion in a pixel electrode in the left and right directions.

6. The device according to claim 5, wherein the first region further includes a plurality of small slits perpendicular to the first slit, wherein a width of the small slits is narrower than that of the first slit.

7. The device according to claim 5, wherein the up and down control region of the second region further includes a plurality of small slits in the pixel electrode in the up and down directions, wherein a width of the small slits is narrower than that of the first or second slit.

8. The device according to claim 7, wherein the small slits have a width of about 5 microns and less and a gap of about 5 microns and less at a surface.

9. The device according to claim 1, wherein the first region has one of a first slit and a first protrusion in a pixel electrode in a slanted direction, and the second region has the left and right control region having one of a second slit and a second protrusion in a pixel electrode in the up and down directions.

10. The device according to claim 9, wherein the first region further includes a plurality of small slits perpendicular to the first slit, wherein a width of the small slits is narrower than that of the first slit.

11. The device according to claim 9, wherein the left and right control region of the second region further includes a plurality of small slits in the pixel electrode in the left and right directions, wherein a width of the small slits is narrower than that of the first or second slit.

12. The device according to claim 11, wherein the small slits have a width of about 5 microns and less and a gap of about 5 microns and less at a surface.

13. The device according to claim 1, wherein voltage which is controlled to have a desired value is applied to the second region.

14. The device according to claim 1, wherein alternating current voltage of a variable period is applied to the second region.

15. The device according to claim 1, wherein alternating current voltage whose frequency is 60 Hz and less is applied to the second region.

16. The device according to claim 1, wherein alternating current voltage which varies a center voltage is applied to the second region.

17. The device according to claim 1, wherein the up and down control region and the left and right control region are arranged in the display screen to form a predetermined pattern.

18. The device according to claim 1, wherein voltage which varies periodically is applied to the second region.

19. The device according to claim 1, wherein each of the pixels further includes a metal line which is formed substantially in parallel with a gate electrode by using a gate layer in the second region and connected to a pixel electrode formed at the second region through a contact hole.

20. The device according to claim 19, wherein the metal line extends across a middle portion of the second region in each of the pixels.

21. The device according to claim 19, wherein the contact hole is formed by a process of forming a hole to contact a pixel electrode of the first region and a source electrode.

22. The device according to claim 19, wherein the metal line is provided at a position opposite to a mounting position of a gate driver to apply voltage.

23. A method for fabricating of a liquid crystal display having a plurality of pixels, comprising:
forming a first region having liquid crystal molecules aligned in a slanted direction; and forming a second region including an up and down control region having the liquid crystal molecules aligned in up and down directions or a left and right control region having liquid crystal molecules aligned in left and right directions, wherein voltage is independently applied to the first region and the second region so that the liquid crystal molecules in the first region is independent controllable from the liquid crystal molecules of the second region, and wherein each of the pixels is one of red, green and blue (RGB) sub-pixels.

* * * * *